US008363818B2

(12) United States Patent  
Gupta

(10) Patent No.: US 8,363,818 B2
(45) Date of Patent: Jan. 29, 2013

(54) ON-HOLD CALL MONITORING SYSTEMS AND METHODS

(75) Inventor: Kshitij Gupta, Davis, CA (US)

(73) Assignee: Apple Inc., Cupertino, CA (US)

( * ) Notice: Subject to any disclaimer, the term of this patent is extended or adjusted under 35 U.S.C. 154(b) by 584 days.

(21) Appl. No.: 12/474,979

(22) Filed: May 29, 2009

(65) Prior Publication Data

US 2010/0303227 A1 Dec. 2, 2010

(51) Int. Cl.
*H04M 3/22* (2006.01)
*H04M 3/523* (2006.01)

(52) U.S. Cl. ............ 379/266.06; 379/32.02; 379/32.04

(58) Field of Classification Search ............ 379/266.06, 379/32.01–32.04, 265.01–266.05, 266.07–266.1
See application file for complete search history.

(56) References Cited

U.S. PATENT DOCUMENTS

| | | | |
|---|---|---|---|
| 5,185,782 A * | 2/1993 | Srinivasan | 379/210.01 |
| 5,214,688 A * | 5/1993 | Szlam et al. | 379/266.08 |
| 6,118,861 A | 9/2000 | Gutzmann et al. | |
| 6,597,779 B1 | 7/2003 | Wilk et al. | |
| 7,349,534 B2 * | 3/2008 | Joseph et al. | 379/265.01 |
| 7,609,829 B2 * | 10/2009 | Wang et al. | 379/201.01 |
| 2005/0278177 A1 | 12/2005 | Gottesman | |
| 2008/0080481 A1 | 4/2008 | Calahan et al. | |
| 2008/0095344 A1 | 4/2008 | Jachner | |
| 2008/0158000 A1 | 7/2008 | Mattrazzo | |
| 2008/0267376 A1 * | 10/2008 | Khasnabish | 379/201.01 |
| 2008/0317234 A1 | 12/2008 | Di Fabbrizio et al. | |

* cited by examiner

*Primary Examiner* — Harry Hong
(74) *Attorney, Agent, or Firm* — Meyertons, Hood, Kivlin, Kowert & Goetzel, P.C.

(57) ABSTRACT

Systems and methods are provided for monitoring telephone calls that are placed on hold. The telephone calls may be between user electronic devices and call centers, such as customer service departments. In some embodiments, the electronic device can monitor an on-hold telephone call using a background process, which may free up a user interface of the electronic device for one or more non-phone-related tasks. The electronic device can monitor the telephone call for an indicator that a live operator is or will soon be present on the telephone call. Responsive to detecting the indicator, the electronic device can alert the user and allow the user to take control of the telephone call. In some embodiments, the electronic device can obtain information about the call center, such as expected on-hold wait-times, to determine whether an on-hold call should be monitored.

29 Claims, 15 Drawing Sheets

ON-HOLD CALL MONITORING SYSTEMS AND METHODS

FIELD OF THE INVENTION

This is directed to systems and methods for monitoring on-hold telephone calls.

BACKGROUND OF THE DISCLOSURE

Today, many businesses provide customer service departments and other call centers so that their customers can speak with them via a telephone call. These call centers allow customers to discuss any of a variety of goods or services provided by the business. However, because numerous customers often contact a call center at approximately the same time, callers are commonly placed on hold for substantial periods of time before a live operator is available to speak with them. This can be extremely frustrating and inconvenient for the callers.

Moreover, users often contact call centers from their personal electronic devices, such as from a cellular telephone. Modern cellular telephones, such as the iphone™ provided by Apple Inc. of Cupertino, Calif., are becoming more and more advanced and provide features other than telephone capabilities. For example, many modern cellular telephones allow users to play games, watch videos, or listen to music. These additional features may be inhibited or become difficult to use when the user is on a telephone call that has been placed on hold.

SUMMARY OF THE DISCLOSURE

Accordingly, systems and methods are provided for monitoring on-hold calls and alerting users when they have been or will soon be taken off hold.

In some embodiments, a user electronic device can communicate with a call center via a suitable telephone network, and can receive telephone data (e.g., voice data or on-hold music) from the call center. When the electronic device is placed on hold, the electronic device can monitor the telephone data for an indicator signaling that a live operator is or will soon be present. In some embodiments, the electronic device can monitor the telephone data using a background process. This way, the electronic device can take control of the telephone call, which gives the user the opportunity to use the electronic device's user interface (e.g., audio output, display, input device, any related circuitry, or any combination thereof) for non-phone-related tasks, such as playing music, games, or videos.

In some embodiments, the electronic device may monitor the telephone data using a speech processor that can detect for keywords indicating that a live operator is or will soon be present on the telephone call. For example, the keywords can include words or phrases that indicate hold status information. This hold status information may be automatically generated by the call center's automated telephone system when the user is placed on hold, and can include information informing the caller of an estimated amount of time until a live operator is expected on the call or of the user's place in a hold queue. By detecting hold status information, the electronic device can determine when the user is still on hold, but will soon be taken off hold.

In some embodiments, the electronic device can monitor the telephone data for indicators that signal that the live operator is actually present on the telephone call, and therefore that the user is no longer on hold. For example, the indicators can include keywords, such as typical greetings (e.g., "Hello, my name is . . . ") or other words or phrases typically spoken by call center operators. In some embodiments, the electronic device can use these keywords upon determining that hold status information is unavailable from the call center or is otherwise undetectable. The indicators can also include other non-verbal sounds or non-audible indicators signaling that the user is being connected to a live operator, such as a ringing sound.

Responsive to detecting an indicator that a live operator is or will soon be present, the electronic device can provide an alert to the user. The alert can be, for example, an audio alert, a haptic alert, or a visual prompt. In response to receiving a user response to the prompt or alert, the electronic device can give control of the telephone call back to the user. The user can therefore switch back from the non-phone-related task to the telephone call immediately before or after the live operator is determined to be present on the telephone call.

In some embodiments, the electronic device can obtain information about the call center from a database. The database can be stored locally on the electronic device or at a remote server. The call center information can include, for example, average on-hold wait-times for the call, which may be compiled and processed based on telephone calls from numerous user electronic devices. The electronic device can obtain and use the call center information in a variety ways, such as to determine whether to automatically begin monitoring an on-hold telephone call without express user request. After the telephone call, information about the telephone call can be used to update the call center information in the database.

BRIEF DESCRIPTION OF THE DRAWINGS

The above and other aspects and advantages of the invention will be apparent upon consideration of the following detailed description, taken in conjunction with accompanying drawings, in which like reference characters refer to like parts throughout, and in which.

DETAILED DESCRIPTION OF THE DISCLOSURE

Systems and methods are provided for monitoring on-hold telephone calls.

Figure 1:
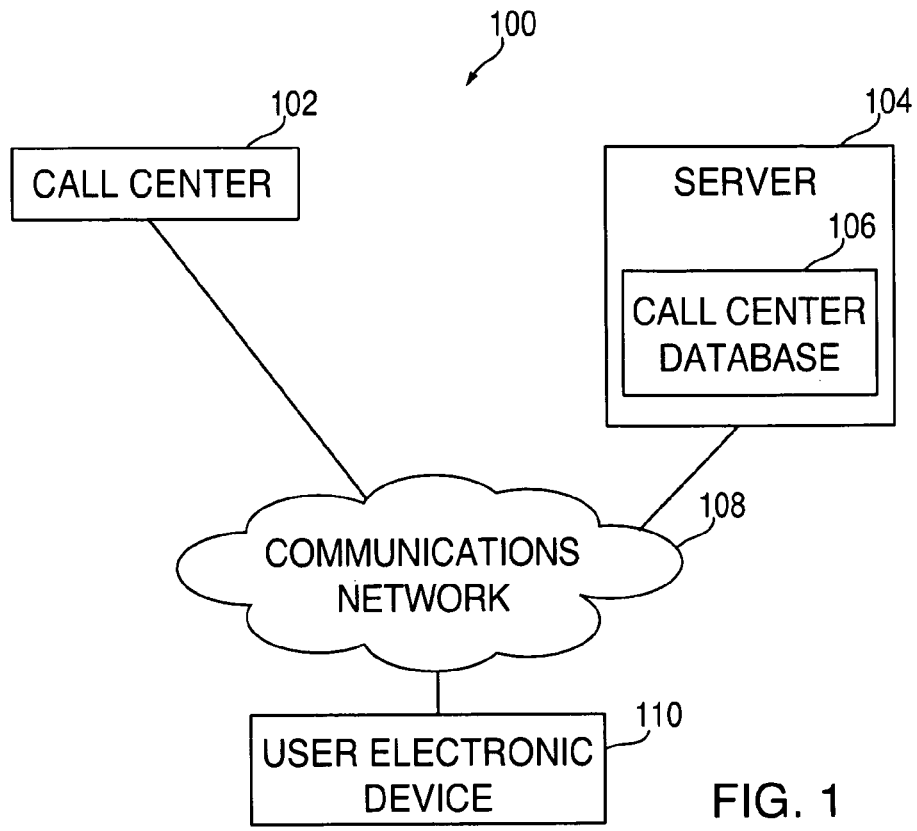
FIG. 1 is a schematic view of a communications system configured in accordance with an embodiment of the invention.

FIG. 1 is a schematic view of illustrative communications system 100. System 100 can include call center 102, server 104, and user electronic device 110. In some embodiments, system 100 can include multiple call centers 102, multiple servers 104, multiple user electronic devices 110, or a combination thereof. To prevent overcomplicating the drawing, only one of each are depicted in FIG. 1.

Call center 102 can include any establishment capable of receiving telephone calls. In some embodiments, call center 102 may be operated by a commercial enterprise that typically receives many calls each day and often places users on hold until a live operator becomes available. For example, call center 102 can include the customer service department of a service-providing company or the technical support department of an electronics-providing company. In some embodiments, call center 102 can include an automatic telephone system that plays audio to callers' telephones while call center 102 keeps them on hold. For example, the audio can include on-hold music, advertisements, hold status information, or any combination thereof. The hold status information played for each caller can indicate, for example, what place in line that caller is in or the estimated number of minutes until a live operator can be expected.

In some embodiments, call center 102 can handle a received telephone call using an automated telephone system (e.g., with an audio menu), one or more live operators (e.g., employees of a commercial establishment), or a combination thereof. For example, the automated telephone system can direct a caller to a particular department (e.g., customer service, billing department, or technical support), which may then allow live operators within that department to receive the appropriate calls. Call center 102 may place a caller on-hold at any juncture in the telephone call, such as prior to using the automated telephone system, prior to directing a caller to a particular department, prior to speaking with the live operator of a particular department, during a conversation with the live operator, or any combination thereof.

Server 104 may include any of a variety of suitable types of servers that can store and provide data to user electronic device 110 (e.g., file server, database server, web server, or media server). Server 104 can include call center database 106 for storing information about various call centers, including but not limited to call center 102. For each call center, the information can include the average amount of time a caller is placed on hold (e.g., for different departments or for different times of day), whether there is an automated telephone system, and, if so, the type of automated telephone system, information on the live operators (e.g., reviews from past callers of competence or pleasantness), and any other statistical data (or otherwise) information about the call center. For simplicity, the amount of time a caller is placed on hold may sometimes be referred to herein as the "wait-time."

Server 104 can receive call center information (or data that server 104 processes to generate call center information) from call center 102, user electronic device 110, or both. For example, information about the automated telephone system may be distributed by call center 102, while data on the average hold time may be gathered and processed from user electronic devices 110. Server 104 can receive requests to download call center information from user electronic device 110 (or any other device). Responsive thereto, server 104 can locate the requested information from call center database 106 and provide the information to user electronic device 110.

Call center 102 and server 104 can communicate with user electronic device 110, or with one another, through communications network 108. Communications network 108 can include one or more suitable wired or wireless links or networks, or combinations thereof, by which data can be exchanged between call center 102, server 104, and/or user electronic device 110. In particular, to enable a telephone call to be connected between call center 102 and user electronic device 110, communications network 108 can include any telephonic network, such as the public switched telephone network (PSTN), a mobile network (e.g., using a GSM or CDMA protocol), the Internet (e.g., for voice over IP (VOIP) protocols), or a combination thereof. In some embodiments, server 104 may also communicate with call center 102 and/or electronic device 110 using a telephone connection, or in other embodiments may use another suitable link and/or protocol.

Communications network 108 can include any type of link and support any suitable protocol. For example, communications network 108 can include satellite links, fiber-optic links, cable links, Internet links, or any other suitable wired or wireless links. These links may enable data transmission using any suitable communications protocol supported by the medium of communications network 108. Such communications protocols may include, for example, Wi-Fi (e.g., a 802.11 protocol), Ethernet, Bluetooth™, radio frequency systems (e.g., 900 MHz, 2.4 GHz, and 5.6 GHz communication systems), infrared, TCP/IP (e.g., the protocols used in each of the TCP/IP layers), HTTP, BitTorrent, FTP, RTP, RTSP, SSH, any other communications protocol, or any combination thereof.

User electronic device 110 may include any suitable electronic device that can communicate with call center 102 and, optionally, with server 104. User electronic device 110 may communicate with server 104 through the same or a different network than with call center 102. For example, user electronic device 110 may be configured to communicate with call center 102 through a mobile network and/or PSTN and with server 104 over the Internet. User electronic device 110 can include a portable media player with telephonic capabilities, a cellular telephone (e.g., an iPhone™), a pocket-sized personal computer, a personal digital assistance (PDA), a desktop computer, a laptop computer, and any other device capable of communicating telephonically via wires or wirelessly (with or without the aid of a wireless enabling accessory device).

Figure 2:
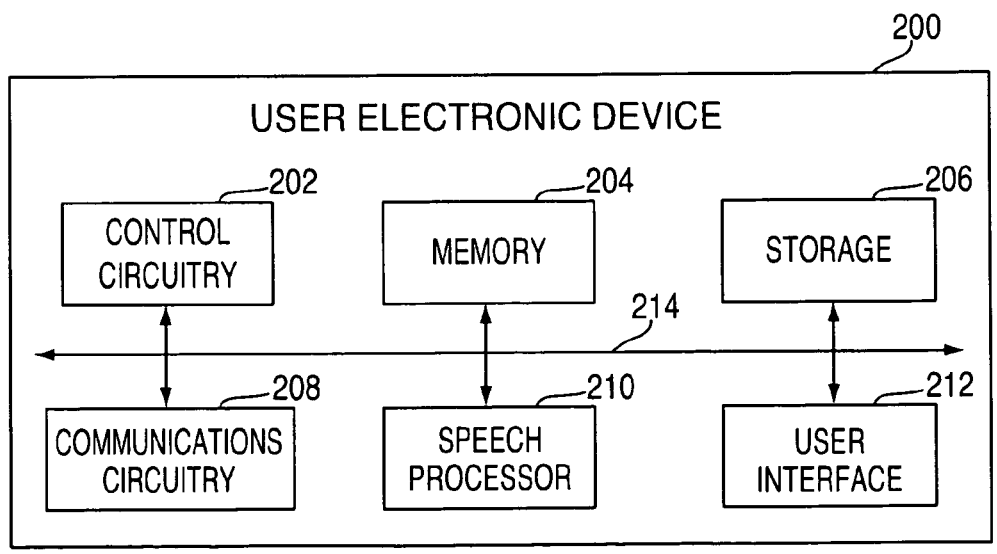
FIG. 2 is a schematic view of a user electronic device configured in accordance with an embodiment of the invention.

Referring now to FIG. 2, a schematic view of illustrative user electronic device 200 is shown. Electronic device 200 can be a device that is the same or similar to user electronic device 110 (FIG. 1), or can be a device that is not operative to communicate with a server such as server 104. In the latter case, call center database 106 may be implemented locally in user electronic device 200 (e.g., in storage 206). Electronic device 200 can include control circuitry 202, memory 204, storage 206, communications circuitry 208, speech processor 210, user interface 212, and bus 214. Electronic device 200 can include other components not shown in FIG. 2, such as a power supply for providing power to the components of electronic device 200. Also, while only one of each component is illustrated, electronic device 200 can include more than one of some or all of the components.

Control circuitry 202 can control the general operation and various functions of device 200. For example, control circuitry 202 can determine how to handle telephone calls with call centers (e.g., call center 102 of FIG. 1) when a telephone call has been placed on hold. As described in detail below, control circuitry 202 can control whether to monitor an on-hold call so that the user is free to perform non-phone-related tasks (e.g., listen to music, view videos, play games, or run other applications on electronic device 200). For example, control circuitry 202 can start an additional background process for monitoring an on-hold call and for alerting the user when to return to the call, thereby freeing user interface 212 and the foreground process for the non-phone-related tasks. This feature of monitoring on-hold telephone calls may sometimes be referred to as "on-hold monitoring," and may be advantageous particularly for electronic devices that have multiple functionalities (e.g., telephone, music player, gaming machine, organizer, calculator, etc.).

Control circuitry 202 can include any components, circuitry, or logic operative to drive the functionality of electronic device 200. For example, control circuitry 202 can include one or more processors acting under the control of an application.

In some embodiments, the application can be stored in memory 204 or storage 206. Memory 204 can include cache memory, Flash memory, read only memory (ROM), random access memory (RAM), or any other suitable type of memory. In some embodiments, memory 204 can include memory dedicated specifically to storing firmware for control circuitry 202. For example, memory 204 can store firmware for device applications (e.g., operating system, user interface functions, and other processor functions). In some embodiments, memory 204 can include the main memory for an application executed by control circuitry 202.

Storage 206 can be any suitable type of storage medium offering permanent or semi-permanent memory. For example, storage 206 can include one or more storage mediums, including for example, a hard drive, Flash, or other EPROM or EEPROM. Storage 206 (or memory 204) can be used by electronic device 200 to store call center information, such as any of the information described above in connection with call center database 106. The call center information can include, for example, any statistical or non-statistical data about call centers that were previously called using electronic device 200 or any other device (from other users) or any data downloaded from server 104 (FIG. 1). Storage 206 or memory 204 can also store any other suitable information, such as speech processing information for speech processor 210 (e.g., keywords or speech models), preference information (e.g., music playback preferences), lifestyle information, exercise information (e.g., obtained from an exercise monitoring system), transaction information (e.g., credit card information), subscription information (e.g., for podcasts or television shows), and other telephone information (e.g., an address book, call log).

Bus 214 may provide a data transfer path for transferring data to, from, or between control circuitry 202, memory 204, storage 206, communications circuitry 208, and some or all of the other components of electronic device 200.

Communications circuitry 208 can enable electronic device 200 to communicate with other devices, such as with a call center (e.g., call center 102 of FIG. 1), other telephone-ready devices, or a server (e.g., server 104 of FIG. 1). For example, communications circuitry 208 can include telephone-enabling circuitry, such as the software and/or hardware necessary to enable a PSTN, mobile, or VOIP connection (e.g., antennas and modems). In some embodiments, communications circuitry 208 can include Wi-Fi enabling circuitry that may permit wireless communication according to one of the 802.11 standards or a private network. Other wired or wireless protocol standards, such as Bluetooth™, can be used in addition or instead.

Speech processor 210 can include any hardware or software, or a combination thereof, for analyzing and interpreting voice data. For example, speech processor 210 can be a software module implemented as computer-readable instructions recorded on a computer-readable medium (e.g., memory 204, storage 206, or another storage unit). In these embodiments, speech processor 210 may be executed by a processor included in control circuitry 202. That is, control circuitry 202 can execute a software-implementation of speech processor 210 in a speech recognition process as either a task or subtask. In other embodiments, speech processor 210 may be a hardware implementation that is controlled by control circuitry 202.

Speech processor 210 can interpret voice data using any suitable technique, such as detecting whether specific words or phrases are present in the voice data. This technique may be referred to as "keyword spotting" and the specific words and/or phrases that speech processor 210 searches for may be referred to as "keywords." Speech processor 210 may be used to analyze voice data of telephone data received from a telephone call with a call center (e.g., call center 102 of FIG. 1) or from any telephone-ready device.

User interface 212 can allow a user to interact with electronic device 200. In some embodiments, user interface 212 can include an audio output, such as any type of speaker (e.g., computer speakers or headphones). The audio output can be used, for example, to provide telephone data, music, or any other audio to the user. In some embodiments, user interface 212 can include a display, such as a liquid crystal display (LCD), a touchscreen display (e.g., multi-touch panel), or any other type of display for presenting visual media or text (e.g., games or graphics such as album cover art) to the user. In some embodiments, user interface 212 can provide haptic outputs (e.g., vibrational outputs). User interface 212 can include an input device, which can take on any of a variety of forms, such as one or more of a button, keypad (e.g., computer keyboard), dial, click wheel, touch screen, or accelerometer.

User interface 212 may enable a user to have control over a telephone call. As used herein, the "control" of a telephone call may refer to whoever or whatever has the ability to determine what interaction to have with the other party on the telephone call (e.g., whether to disconnect the telephone call, etc.). For example, a user may have control over the telephone call when the user can speak with the other party using a microphone of user interface 212 and can hang up the telephone call via a button of user interface 212.

Electronic device 200 can be configured to perform on-hold monitoring when a telephone call is placed on hold by the other party (e.g., call center 102 of FIG. 1). While the user performs other non-phone-related activities, electronic device 200 can run a background process that may take the control of the telephone call from the user and may monitor incoming telephone data from the on-hold call. Electronic device 200 can monitor the telephone data for indicators (e.g., keywords) that may indicate that the live operator is or will soon be present. Responsive to detecting an indicator, electronic device 200 can provide a visual, haptic, and/or audio alert to the user signaling that it is time to regain control of the telephone call. This way, while the user is placed on hold, the user can give all or nearly all of his or her attention to performing other activities and does not have to worry about the status of the on-hold call (whether using the telephone or not).

More detailed descriptions of various techniques that electronic device 200 can use to provide on-hold monitoring will be described in detail in connection with FIGS. 3, 4, 7, 8, 11, and 12.

FIGS. 3, 4, 7, 8, 11, and 12 are flowcharts of illustrative processes that can be executed by an electronic device (e.g., user electronic device 200). It should be understood that these processes are merely illustrative. Any steps in these processes may be modified, removed, or combined, and any steps may be added, without departing from the scope of the disclosure.

Figure 3:
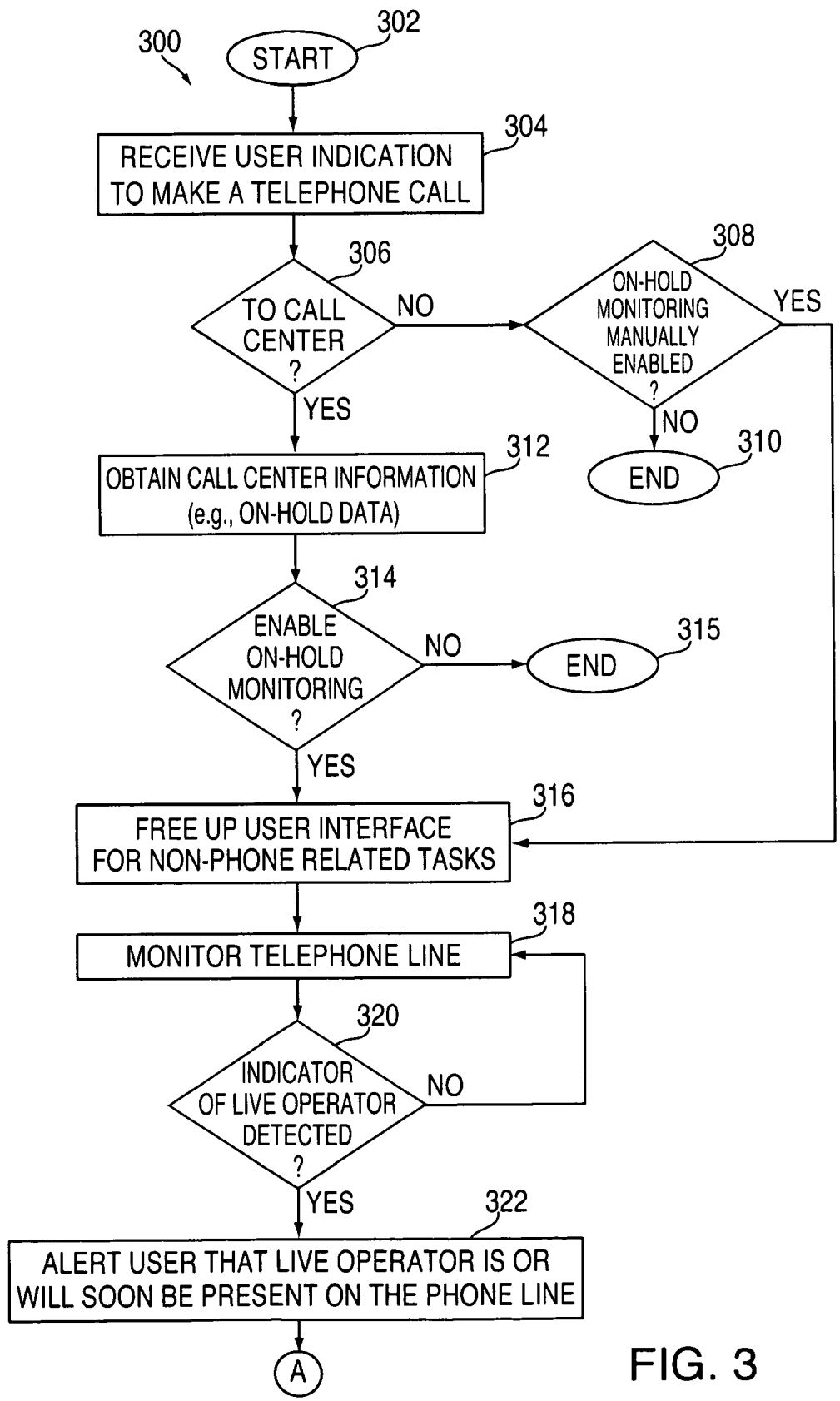
FIGS. 3 and 4 are a flowchart of an illustrative process for monitoring an on-hold telephone call with a call center in accordance with an embodiment of the invention.
Figure 4:
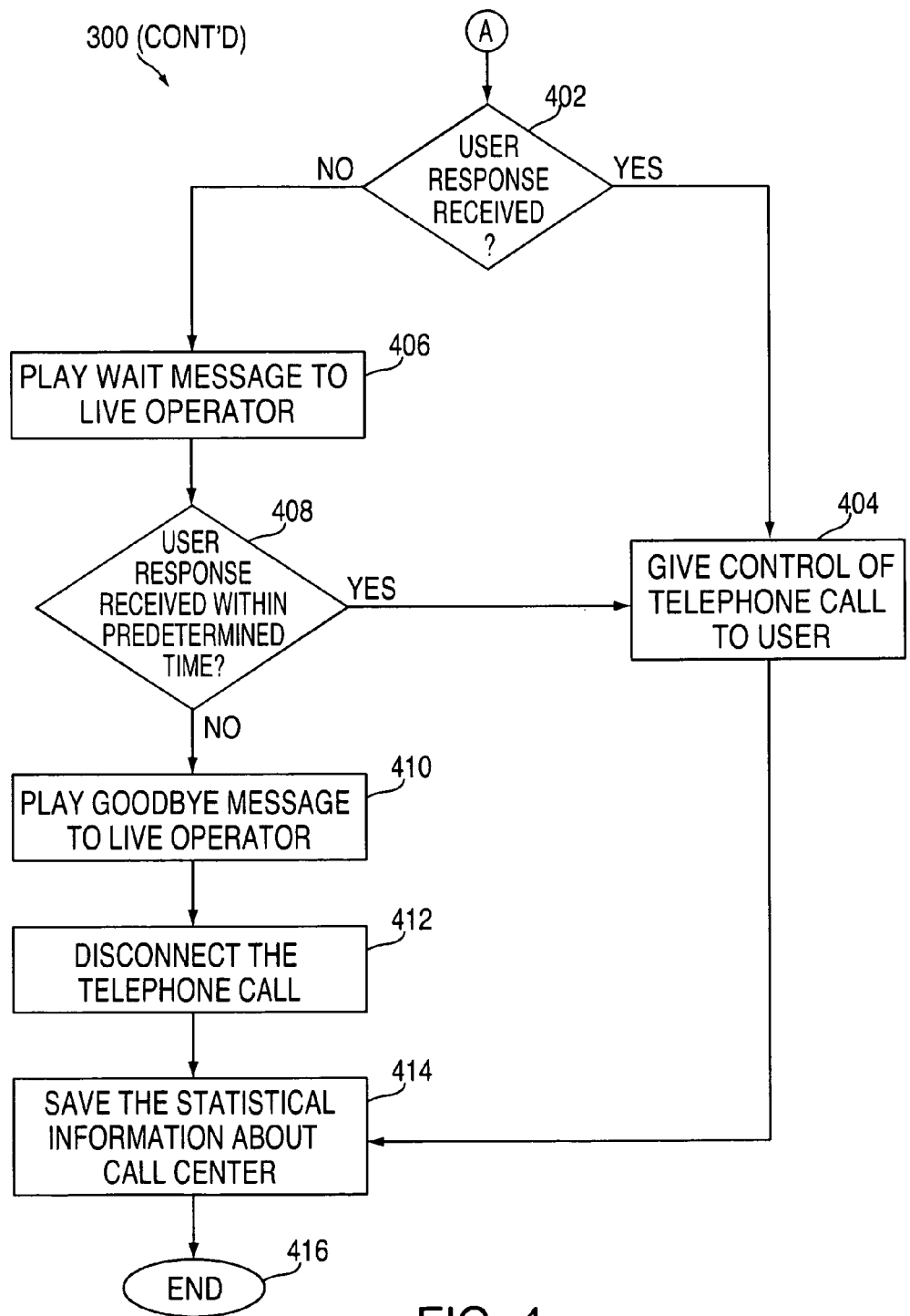

Referring first to FIGS. 3 and 4, a flowchart of illustrative process 300 is shown for monitoring an on-hold call with a call center. Process 300 can begin at step 302 in FIG. 3. At step 304, the electronic device can receive a user indication to make a telephone call. For example, the electronic device may allow the user to enter the telephone number of a call recipient. Then, at step 306, the electronic device can determine whether the telephone call is directed to a call center. In some embodiments, this determination can involve identifying whether the telephone number is a toll free number, such as a 1-800, 1-888, 1-877, or 1-866 number, determining whether the telephone number matches a number or business in a call center database (e.g., call center database 106 of FIG. 1 or a locally-stored call center database), or both.

If, at step 306, the electronic device determines that the call recipient is not a call center, process 300 can end at step 310 without enabling on-hold monitoring. At this point, the user may have control of the telephone call and can, in some embodiments, manually initiate on-hold monitoring. Thus, at step 308, the electronic device can determine whether on-hold monitoring has been initiated manually by the user. The user may manually initiate on-hold monitoring when, for example, the call recipient places the user on hold during the telephone call, or if the telephone call was made to a call center not recognized by the electronic device or call center database. If on-hold monitoring is manually initiated, process 300 may continue to step 316, described below. Otherwise, process 300 may end at step 310.

Returning to step 306, if the electronic device determines that the call recipient is a call center, process 300 can move to step 312. At step 312, the electronic device can obtain call center information about the recipient call center or a particular department of the call center. The electronic device can obtain this information from a call center database, which can be stored locally on the user device or from a server (e.g., server 104 of FIG. 1). The call center information can include on-hold data, such as whether the call center or department typically places users on hold or the average wait-time for the recipient (e.g., overall, for that time of day, for that season, etc.). The call center information can include any other suitable statistical or non-statistical data described above in connection with call center database 106 of FIG. 1.

Process 300 can continue to step 314, and the electronic device can determine whether to enable on-hold monitoring. This determination can be based on any of a variety of factors, including but not limited to the call center information (e.g., on-hold data), any user preferences, or based on whether the user has manually requested on-hold monitoring. For example, in some embodiments, to make this determination, the electronic device can provide a prompt to the user requesting a decision about whether to enable on-hold monitoring.

Figure 5:
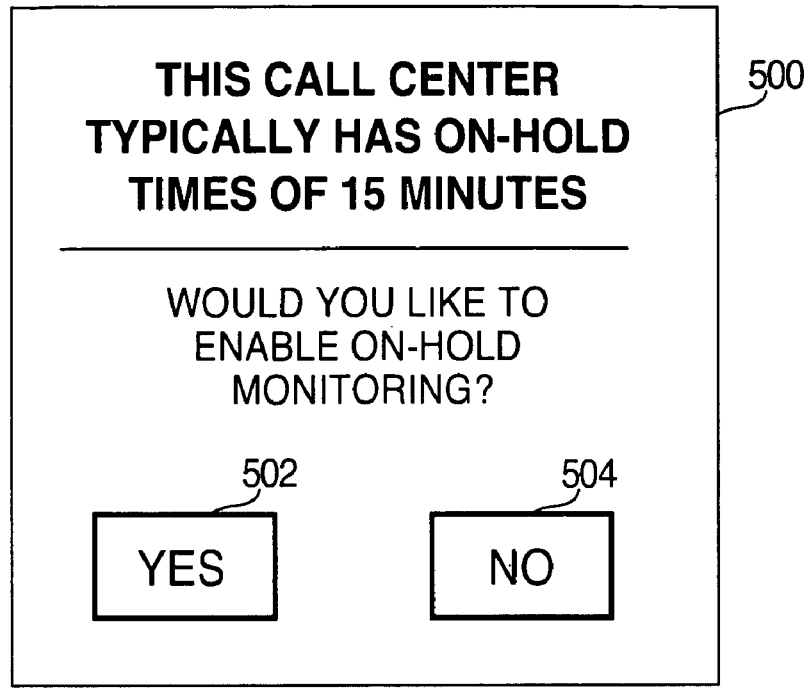
FIG. 5 is an illustrative display screen for prompting a user to enable on-hold monitoring in accordance with an embodiment of the invention.

FIG. 5 shows an illustrative display screen of one such prompt. Prompt 500 can inform the user that a substantial wait-time is expected for this call center (e.g., 15 minutes in this example), and may allow the user to enable or not enable on-hold monitoring using selectable icons 502 and 504, respectively. Display screen 500 may be displayed, for example, as a full screen display or overlay on a touchscreen. The user can select one of icons 502 and 504 by touching the appropriate part of the touchscreen. It should be understood that prompting a user is just one way that the electronic device can make the determination at step 314 (FIG. 3). Other ways that the electronic device can determine whether to enable on-hold monitoring will be described below in connection with FIG. 7.

Responsive to the user selecting "no" icon 504 of FIG. 5, or using any other suitable approach, the electronic device may not enable on-hold monitoring and can instead allow the user to maintain control of the telephone call. In particular, returning to FIG. 3, process 300 can move from step 314 to step 315 and end. Otherwise, responsive to receiving a user selection of "yes" icon 502 (FIG. 5), or using any other suitable approach, on-hold monitoring may be enabled for the telephone call. That is, at step 316 of FIG. 3, the electronic device can free up the user interface (e.g., display, audio output, and user input) so that the user can perform non-phone-related tasks, such as play games, movies, or music. The electronic device can, for example, start a new thread or process so that the electronic device (instead of the user) may take control of the telephone call. On-hold monitoring and any non-phone-related task can therefore occur concurrently.

Using the new thread or process, the electronic device can monitor the telephone line at step 318. For example, the electronic device can monitor incoming telephone data using a speech processor (e.g., speech processor 210 of FIG. 2) to detect any indicators that a live operator is or will soon be present. The indicators may be keywords, such as phrases typically spoken by live operators when greeting a caller (e.g., "Hello, my name is . . . "). The indicators (e.g., keywords) may include hold status information indicating the caller's place in a hold queue or the estimated minutes until a live operator can be expected (e.g., that the user is in the first or second place in the queue or that the wait will be less than two minutes). Monitoring an on-hold call using speech processing will be described in greater detail below in connection with FIG. 8.

In some embodiments, the electronic device can monitor the incoming telephone data at step 318 for non-speech or non-audible data that may indicate that a live operator is or will soon be present on the telephone call. For example, the call center's automatic telephone system may provide hold status information for the purpose of enabling on-hold monitoring, and not so that a user waiting on hold may be informed of the on-hold status.

Process 300 may continue to step 320. At step 320, the electronic device may determine whether the incoming telephone data corresponds to an indicator that a live operator is or will soon be present. If it does not, the electronic device can ignore the telephone data and can continue monitoring the telephone line at step 318. This way, the electronic device can ignore any telephone data that is not of interest, such as on-hold music or advertisements. If, at step 320, the electronic device instead determines that an indicator of a live operator is detected, process 300 can move to step 322.

At step 322, the electronic device can alert the user that the live operator is or will soon be present on the telephone line based on the detection at step 320. The electronic device can use any suitable type of alert, including any combination of visual, audio, and haptic alerts.

Figure 6:
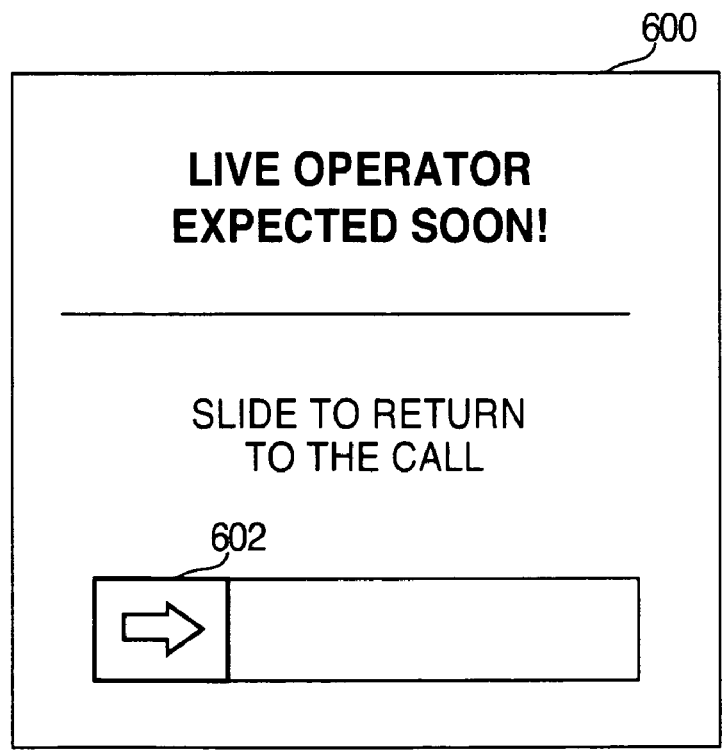
FIGS. 6 is an illustrative display screen for prompting a user to disable on-hold monitoring in accordance with an embodiment of the invention.

FIG. 6 shows an illustrative visual alert that can be provided by the electronic. The electronic device can display prompt 600 as a full screen display or an overlay on a touch screen, for example, to alert the user that a live operator will soon be present on the telephone line. Prompt 600 can include slider 602 for receiving a user input, or any other type of virtual input mechanism, such as "yes" and "no" button. Other ways for the electronic device to alert the user of the presence or imminent presence of a live operator will be described below in connection with FIG. 12.

Returning to process 300, which continues from step 322 in FIG. 3 to step 402 in FIG. 4, the electronic device can determine whether a user response to the visual, audio, and/or haptic alert has been received. The user response may indicate that the user wants to regain control of the telephone call. The response may be, for example, receipt of the user moving slider 602 on prompt 600 (FIG. 6), the user press of a physical or virtual button, or any other suitable user input. If, at step 402, the electronic device determines that a user response to the alert has been received, the electronic device can give control of the telephone call back to the user at step 404. For example, the telephone call, which may have been monitored in a background process, may become the foreground process, and the electronic device may allow the user to control the telephone call via the electronic device's user interface. In some embodiments, step 404 can involve suspending a non-phone-related task that the user was employing while the telephone call was being handled by the background process. Process 300 can then continue to step 414, described below, at any suitable time (e.g., immediately after giving control to the user or after the telephone call is ended).

Returning to step 402, if the electronic device instead determines that a user response has not been received, process 300 can move to step 406. At step 406, the electronic device can play a message to the live operator informing the live operator that the user will return momentarily and asking that the live operator wait for the user's return. The electronic device may play the message responsive to detecting that the live operator is actually present (as opposed to being expected soon). In some embodiments, step 406 can involve placing the live operator on hold and/or muting the device's microphone so that the live operator only hears this message (and not any noise that may be picked up by the electronic device).

The message played at step 406 can be a pre-recorded message (e.g., one made by the user or by the device itself), a synthesized message, or can be generated using any other suitable approach. In some embodiments, a pre-recorded message can be used to make the live operator believe that the user is actually on the telephone call. In these embodiments, the electronic device or message can use any suitable approach for simulating a live situation, such as making an excuse for why the user needs a moment away from the telephone, and including any background noise with the message (e.g., a baby crying or crashing sounds) to back up the user's excuse. This way, if the live operator believes the user is actually present, the live operator may be less likely to disconnect the telephone call.

Process 300 can continue to step 408, and the electronic device can determine whether a user response from the alert has been received within a predetermined amount of time (e.g., 10, 15, 20, or 30 seconds) after, for example, the user was first alerted at step 322 (FIG. 3) or after playing the message at step 406. If so, the electronic device can give control of the telephone call to the user at step 404. Otherwise, at step 410, the electronic device can play a pre-recorded or synthesized message saying goodbye to the live operator. The goodbye message can include any apologies and/or excuses to simulate an actual scenario. The electronic device may then disconnect the telephone call at step 412.

Continuing to step 414, the electronic device can save any statistical information or non-statistical information about the telephone call. The electronic device can save the information in a local storage (e.g., memory 204 or storage 206 (FIG. 2)) or at a remote server (e.g., in call center database 106 (FIG. 1)). This way, the call center information for the call center and/or department can be updated with current information about that call center. The electronic device can save any suitable information about the telephone call, such as data on how long the user was put on hold, the time of the call, how well the on-hold monitoring was able to detect the presence of a live operator, the keyword used to identify the presence of the live operator, or a combination thereof. The electronic device can collect this information automatically from monitoring the telephone call (e.g., at step 318 in FIG. 3), from express user input, or both. For example, the electronic device can provide a survey to the user at the end of the telephone call to collect data, such as information about how satisfied the user was with the service received by the call center or with the service of the on-hold monitoring feature. Any of this information (or other information) can be collected to increase the effectiveness of the on-holding monitoring process the next time it is invoked. Process 300 may then end at step 416.

Figure 7:
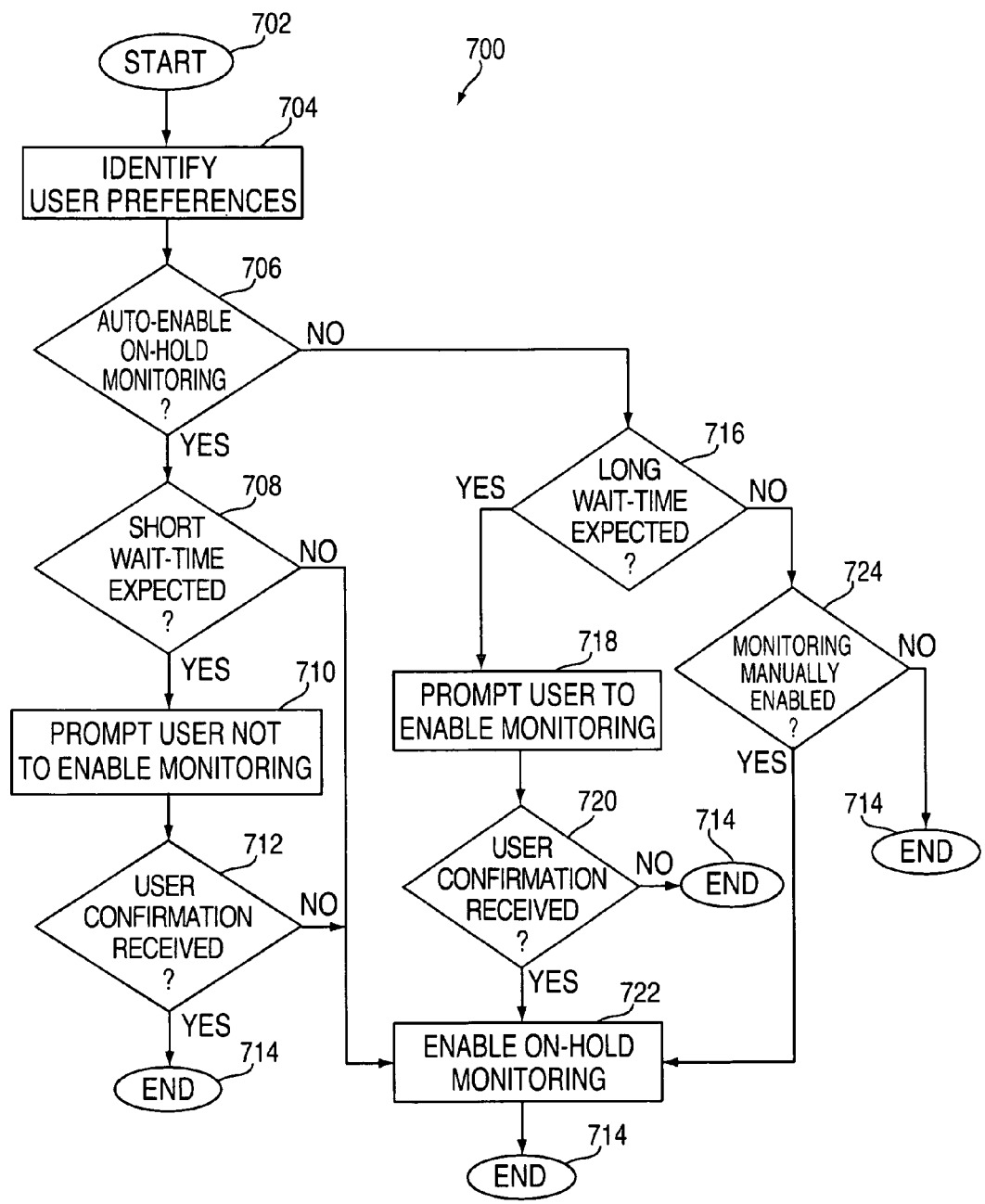
FIG. 7 is a flowchart of an illustrative process for enabling on-hold monitoring in accordance with an embodiment of the invention.

Turning to FIG. 7, a flowchart of illustrative process 700 is shown for determining whether to enable on-hold monitoring. Process 700 can be a more detailed view of step 314 of process 300 (FIG. 3). Process 700 can begin at step 702 in which a telephone call to a call center will be or has been made by the user. At step 704, the electronic device can determine the user's preferences with respect to on-hold monitoring. In some embodiments, the user preferences may have been previously entered by the user or may be automatically determined based on monitoring the user's activity. The user preferences can indicate whether the user prefers to have on-hold monitoring enabled automatically when a call is placed on hold.

Then, at step 706, the electronic device can determine, based on the user preferences, whether to automatically enable on-hold monitoring. If so, process 700 can continue to step 708 and the electronic device can determine whether a short wait-time on hold can be expected for this call center. For example, the electronic device can determine whether the average hold time for the call center is below a predetermined amount of time (e.g., 1, 2, or 5 minutes). However, it should be understood that a "wait-time" (as defined above) can be measured using any suitable unit, and does not necessarily refer to a standard time unit (e.g., minutes). For example, the electronic device can make the determination at step 708 based on the number in line that a caller is typically placed in a hold queue. The electronic device may obtain the information to make this determination using call center information stored locally or from a server, such as server 104 of FIG. 1.

If a short wait-time is not expected, the electronic device can automatically enable on-hold monitoring at step 722 and process 700 can end at step 714. If a short wait-time can be expected, it may not make sense for on-hold monitoring to be enabled regardless of the user's preference to automatically enable on-hold monitoring. In this case, the electronic device can prompt the user not to enable on-hold monitoring. If the user responds to the prompt confirming or agreeing to the prompt, process 700 can end at step 714 without enabling on-hold monitoring. Otherwise, the electronic device may enable on-hold monitoring at step 722.

Returning to step 706, if the electronic device determines that the user does not prefer to have on-hold monitoring automatically enabled, process 700 can move to step 716. At step 716, the electronic device can determine whether a long on-hold wait-time can be expected for this call center. For example, the electronic device can determine whether the average hold time for the call center is above a predetermined threshold (e.g., 5, 10, or 15 minutes), or whether callers are typically placed at least at a predetermined position in the hold queue. The electronic device can make this determination based on call center information stored locally or from a server, such as server 104 of FIG. 1. If a long wait-time may be expected, the electronic device can prompt the user to enable on-hold monitoring at step 718. The prompt may be the same as or similar to prompt 500 of FIG. 5. If a user response is received in agreement with the prompt, on-hold monitoring may be enabled at step 722. Otherwise, process 700 can end at step 714 without enabling on-hold monitoring.

Looking again to step 716, if a long wait-time on hold may not be expected, the electronic device may not enable on-hold monitoring and can instead allow the user to maintain control of the telephone call. At this point, on-hold monitoring may not be enabled unless expressly requested by the user (e.g., by pressing a physical or a virtually displayed button on the electronic device). If, at step 724, the electronic device determines that on-hold monitoring has been manually enabled, the electronic device can enable on-hold monitoring at step 722. Otherwise, process 700 can end at step 714 without enabling on-hold monitoring.

Figure 8:
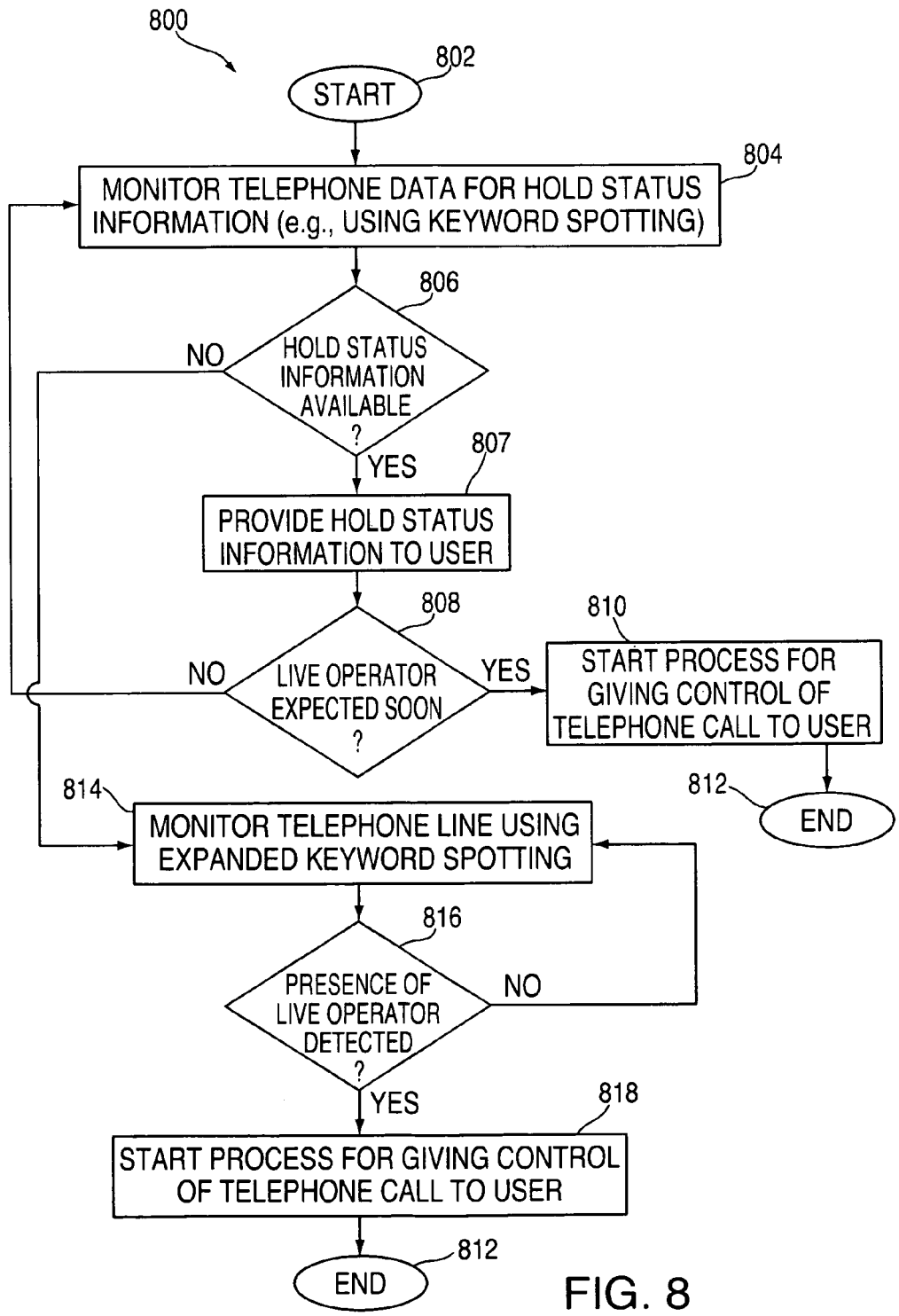
FIG. 8 is a flowchart of an illustrative process for monitoring a telephone line using speech processing in accordance with an embodiment of the invention.

FIG. 8 shows a flowchart of illustrative process 800 for monitoring an on-hold telephone call with a call center using speech processing. Process 800 may be a more detailed view of step 318 of process 300 (FIG. 3). Process 800 can begin at step 802 in which on-hold monitoring has been enabled. Then, at step 804, the electronic device can monitor incoming telephone data for hold status information. The hold status information can include an indication of the wait-time that the user can expect to be placed on hold, such as what place in line the user is in or an expected number of minutes on hold.

The electronic device can monitor the telephone data for this information using keyword spotting. For example, the electronic device can attempt to detect a number followed by a unit of time (e.g., "5 minutes") or a number followed by keywords indicating a place in line (e.g., "third in line"). Thus, the electronic device can perform speech processing on the telephone data, and may initially use a specific set of keywords as indicators to obtain hold status information. In these or other embodiments, the electronic device may attempt to detect non-audio indicators of hold status information from the telephone data.

Then, at step 806, the electronic device can determine whether hold status information is available. For example, the electronic device may determine whether the specific keywords have been detected within a predetermined amount of time (e.g., 1, 2, 5 minutes). If not, the call center may not provide this information or may not present the hold status information in a format recognizable by the electronic device. If so, the electronic device can provide the user with this hold status information at step 807. For example, the electronic device can display the hold status information at a corner of the display. This way, the user can be informed at any or all times of his or her status on the telephone call.

Figure 9:
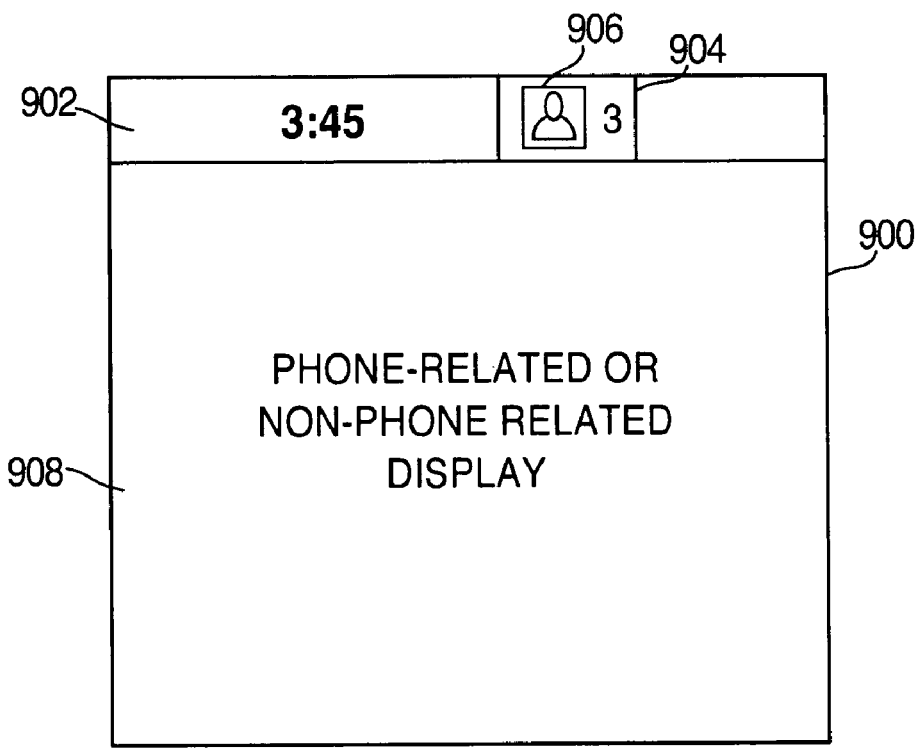
FIGS. 9 and 10 are illustrative display screens for providing hold status information to a user while a telephone call is placed on hold.
Figure 10:
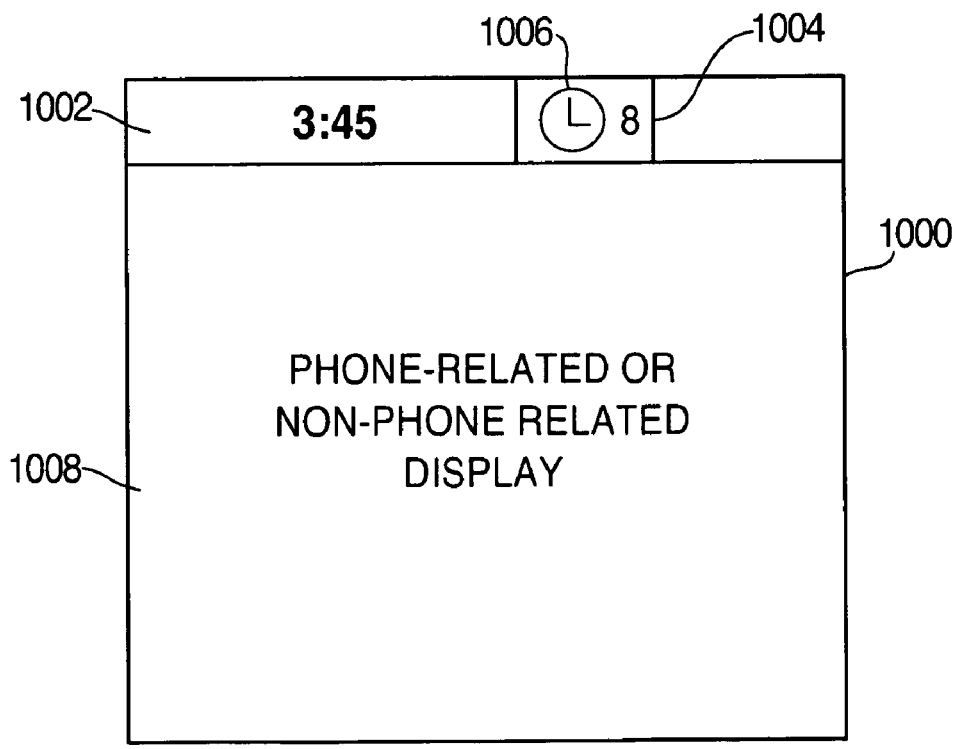

For example, FIGS. 9 and 10 illustrate some ways in which the electronic device may provide updated status information to the user on his or her on-hold wait times. FIGS. 9 and 10 show illustrative display screens 900 and 1000, either of which may be displayed by the electronic device while on-hold monitoring is enabled. Display screens 900 and 1000 can include status areas 902 and 1002 (respectively) and main areas 908 and 1008 (respectively). The respective main areas may be used to display phone-related or non-phone related displays, such as a virtual telephone keypad, video, game, or home screen. The respective status areas may be used to provide information on the status of the user device or any other suitable information, such as the time, date, battery usage, carrier/wireless status, whether an alarm has been set, etc.

Status areas 902 and 1002 can also be used to display the hold status information obtained at step 806 (FIG. 8). More particularly, status area 902 of FIG. 9 may include hold status area 906 for displaying the user's place in line in the hold queue, while status area 1002 may include hold status area 1006 for displaying the estimated number of minutes until a live operator is expected. Hold status areas 906 and 1006 can include icons 906 and 1006, respectively, to indicate whether the number provided indicates a place in line or an estimated amount of time. Thus, in the examples of FIG. 9 and 10, display screen 900 may be displayed when the user is third in line in the hold queue, and display screen 1000 may be displayed when the user has approximately eight minutes to wait until the live operator is present.

In some embodiments, status areas 906 and 1006 of FIGS. 9 and 10, respectively, may be color-coded. The status areas may change to different colors depending on whether the user still has a long time to wait. The electronic device can use any other technique for visually distinguishing between different states (e.g., different textures or patterns, etc.), and not just different colors. In some embodiments, the electronic device may provide some indication (e.g., blinking indicator) when the number in the status area changes (e.g., from eight minutes to seven minutes, etc.).

Figure 11:
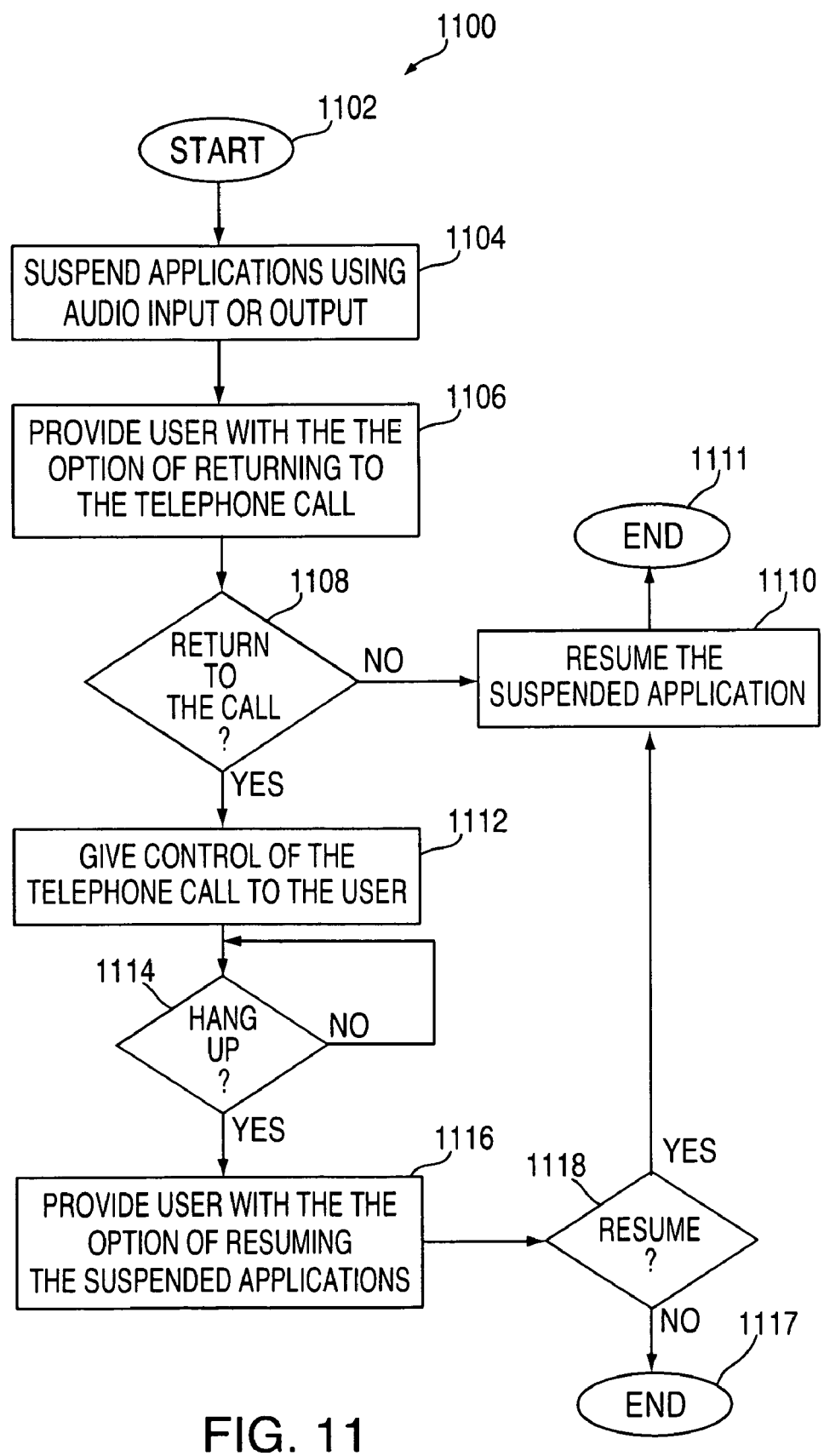
FIG. 11 is a flowchart of an illustrative process for handling non-phone-related applications when a live operator is or will soon be present on a telephone call.

Returning to FIG. 8, at step 808, the electronic device may use the hold status information (e.g., the user's place in line or estimated number of minutes remaining) to determine whether the live operator will soon be present on the telephone line. In some embodiments, the electronic device can determine whether the expected wait-time is below a predetermined number of minutes or positions in line. If the electronic device determines that the live operator is expected soon using this metric, the electronic device can begin the process for giving control of the telephone call to the user (e.g., alerting the user, etc.) at step 810. This way, the user may regain control of the telephone call in advance of the live operator connecting the call, yet the user may not have to wait a substantial amount of time for the live operator. Moreover, the live operator may be kept unaware of the on-hold monitoring and may not be given an opportunity to hang up the call. FIG. 11 shows one way in which the electronic device can start to give control of the telephone call back to the user.

If, at step 808, the hold status information does not indicate that a live operator will be present soon, the electronic device can continue monitoring the telephone data at step 804 for the next time that hold status information is provided.

Returning to step 806, if the electronic device is not able to detect hold status information, the electronic device may instead detect for the actual presence of the live operator on the telephone call. In particular, process 800 can move to step 814, and the electronic device can monitor the incoming telephone data using an expanded set of keywords. The expanded set of keywords can include keywords that may indicate that a live operator is actually present on the other end of the telephone call. For example, the keywords can include any or all of the expected initial greetings that the live operator may use (e.g., "Hi, my name is . . . ," "how may I help you today . . . ," etc.) and any or all of the expected "re-greetings." "Re-greetings" can include any words or phrases that the live operator may say if nobody responds to the initial greeting, such as "Hello?" or "are you there?".

Accordingly, even if the electronic device is unable to detect indicators that a live operator will soon be present (and relies instead on detecting the actual presence of the live operator), the on-hold monitoring feature may not require the live operator to do or say anything that the live operator would not normally do or say. This way, the live operator may not be tempted to disconnect the telephone call, and may still be kept unaware of the on-hold monitoring feature. This could remain true even if there is a slight delay between the time the live operator connects the telephone call and the time the user disables on-hold monitoring.

Returning to step 814, the electronic device may monitor the telephone data for a ringing sound, which can indicate that the telephone call is being connected to the live operator. At this point, the electronic device can continue monitoring the telephone data for a greeting or re-greeting to confirm that a live operator is present. Alternatively, the electronic device can treat the ringing in the same or a similar way as if one of the keywords in the expanded set were detected. Also, the expanded set of keywords may or may not include keywords signaling hold status information, and thus the electronic device may or may not continue processing the telephone data for hold status information.

Thus, at step 814, the number of keywords that the user device attempts to detect may increase compared to the number attempted at step 804. By not employing keyword spotting with the expanded set of keywords until the spotting of the initial smaller set of keywords is unsuccessful, the user electronic device can minimize the processing power used by the on-hold monitoring feature. This can be beneficial if the user is also using the electronic device for non-phone-related tasks, for example.

Continuing to step 816, the electronic device can continue to monitor the telephone data for the larger set of keywords until the presence of a live operator is detected. Process 800 may then continue to step 818 at which time the electronic device may start the process of returning control of the telephone call to the user. Step 818 may or may not be the same as step 810, described above. For example, in some embodiments, the electronic device may provide different types of alerts or may display different information in a visual alert at step 818 than at step 810. Process 800 may then end at step 812.

Turning to FIG. 11, a flowchart of illustrative process 1100 for handling non-phone-related applications when a live operator is or will soon be present on a telephone call. Some steps of process 1100 may be a more detailed view of step 810 and/or step 818 of FIG. 8. Process 1100 may begin at step 1102, where the electronic device may have determined that a live operator is or will soon be present on a telephone call. At step 1104, the electronic device can suspend applications that use audio input or audio output. These applications can include, for example, any non-phone-related applications that the user may be using while waiting for the live operator to return to the telephone call (e.g., games, videos, music, etc.). In some embodiments, the electronic device may also suspend other applications that do not use an audio input or output (e.g., applications that only use the display).

Then, at step 1106, the electronic device may provide the user with the option of returning to the telephone call. The electronic device may, for example, may provide any suitable type of alert, such as a visual, audio, or haptic alert. If, at step 1108, the electronic device determines that the user does not want to return to the telephone call, the electronic device may resume the suspended applications at step 1110. The electronic device may determine that the user does not want to return to the telephone call if, for example, the user does not respond to the alert within a predetermined amount of time (e.g., 10, 15, 30 seconds) or if the user expressly chooses not to return to the telephone call (e.g., by selecting a "no" button). Process 1100 may continue to step 1111 and end.

If, at step 1108, the electronic device instead determines that the user wants to return to the telephone call, process 1100 can continue to step 1112. At step 1112, the electronic device can give control of the telephone call to the user. At this point, the user interface may be used to allow the user to control the flow of the telephone call.

Continuing to step 1114, the electronic device can determine whether the telephone call has been disconnected. If so, the electronic device can provide the user with the option of resuming the suspended applications at step 1116. If the user selects not to resume the applications, process 1100 may end at step 1111 (and in some embodiments may also terminate the suspended applications). If the user selects instead to resume the suspended applications, the electronic device can do so at step 1110 and process 1100 can end at step 1111. In other embodiments, the electronic device may automatically resume the suspended applications once the telephone call is disconnected, or the electronic device may not prompt the user to resume the suspended applications (and instead wait for the user to request that the applications be resumed).

Figure 12:
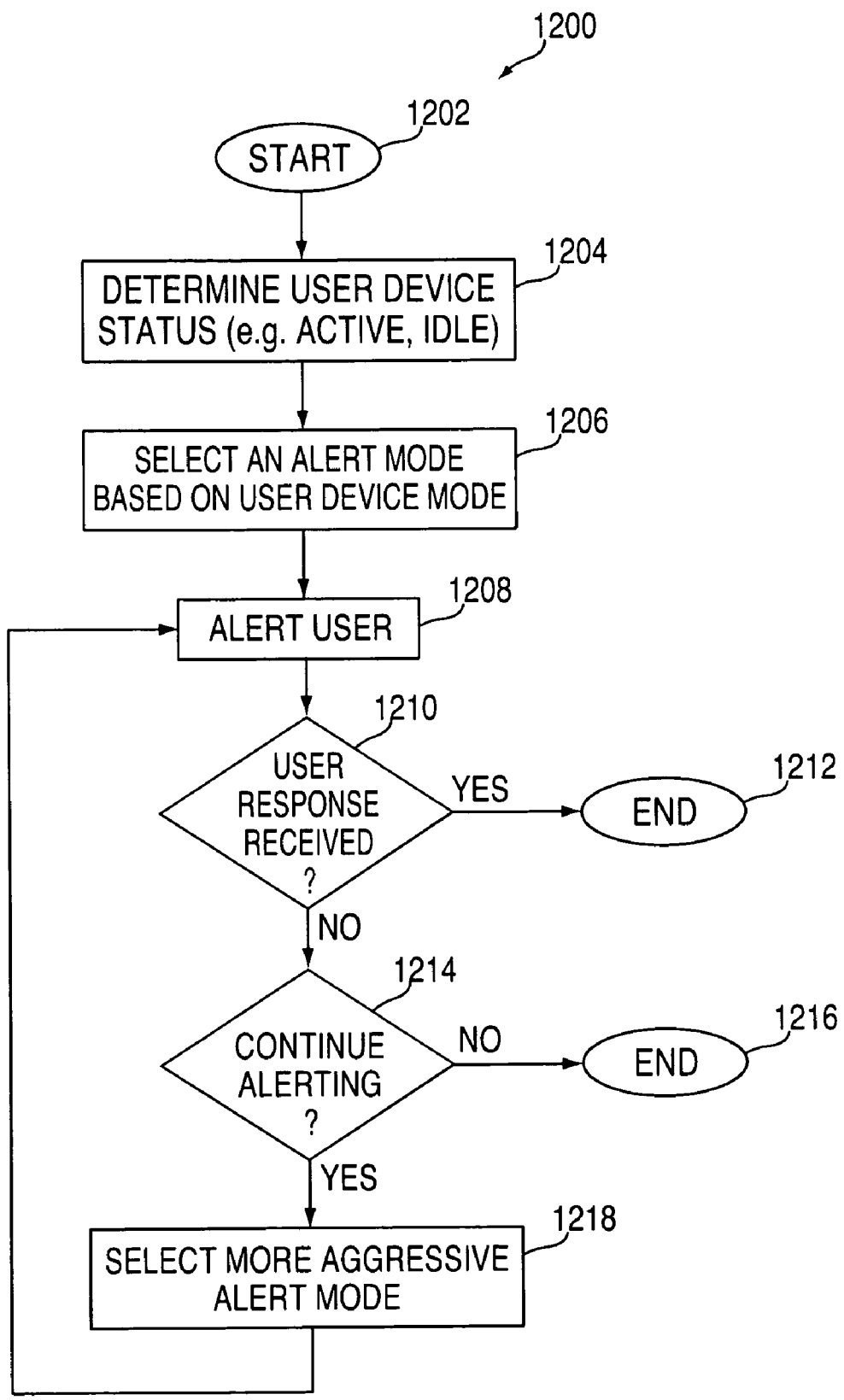
FIG. 12 is a flowchart of an illustrative process for alerting a user of the presence of a live operator in accordance with an embodiment of the invention.

Referring now to FIG. 12, a flowchart of illustrative process 1200 for alerting the user of the presence of a live operator. Process 1200 may be a more detailed view of step 322 of process 300 (FIG. 3). Process 1200 can begin at step 1202, where the electronic device has determined that a live operator is or will soon be present on the other end of the telephone line. At step 1204, the status of the electronic device can be determined. The electronic device can determine whether it is "idle" or "active" based on when the last time a user input was received or the last time a non-on-hold process output was provided, for example (e.g., if the user is watching a movie). The electronic device can also determine whether an application is being actively used (e.g., a game) and which parts of the user interface are utilized by the application (e.g., display, user input, audio output, or a combination thereof).

Then, at step 1206, the electronic device can select an alert mode based on user device status. The different modes can include an audio mode (e.g., ring or alarm sounds), a visual mode (e.g., a display prompt), a haptic mode (e.g., a vibrational response), or any combination thereof. In some embodiments, the electronic device can select the alert mode based on whether the electronic device is active or idle. For example, the electronic device may select a less aggressive alert mode (e.g., haptic mode) if the device is active rather than idle, as less is probably needed to get the user's attention. In other embodiments, the electronic device can select the alert mode based on the non-hold-mode application being used by the user. For example, if a music application is being used, the electronic device may select an audio alert mode, as this may be most effective way to get the user's attention. On the other hand, if the user is actively playing a game using the display, the electronic device may not select a visual alert mode, as this may interrupt the game in the event that the user does not wish to return to the telephone call.

After selecting an alert mode, the electronic device may alert the user of the live operator's presence using the selected alert mode at step 1208. Then, at step 1210, the electronic device may determine whether a user response to the alert has been received (e.g., within a predetermined amount of time). If so, the electronic device may have successfully alerted the user of the presence of a live operator, and process 1200 can end at step 1212.

Otherwise, process 1200 can continue to step 1214. At step 1214, the electronic device can determine whether to continue alerting the user of the presence of the live operator. The electronic device may make this determination based on the number of times that the electronic device has already alerted the user, user preferences, or the amount of time that has passed since first alerting the user. If the electronic device determines that no further alerts should be provided, process 1200 may end at step 1216. Otherwise, the electronic device can select a more aggressive alert mode at step 1218 (if available). This way, the electronic device may have more success obtaining the user's attention. For example, if the electronic device previously used a haptic alert mode, the electronic device may switch to an audio and haptic alert mode. Process 1200 may then return to step 1208, and the electronic device can alert the user using the more aggressive alert mode.

FIGS. 13A-13D and 14A-14H show two sequences of illustrative display screens. These sequences show various display screens that an electronic device can provide to illustrate various on-hold monitoring features described above. It should be understood that these display screens are merely illustrative, and that different sequences may be provided depending on user input, user preference settings, and the particular implementation of on-hold monitoring.

Looking first to FIGS. 13A-13D, a first sequence of display screens are shown that illustrate a possible operating scenario. In particular, FIGS. 13A-13D illustrate the display screens that an electronic device may provide when the device cannot identify a call center (e.g., the call center does not have an entry in the call center database or the call center does not have a toll free number).

Figure 13A:
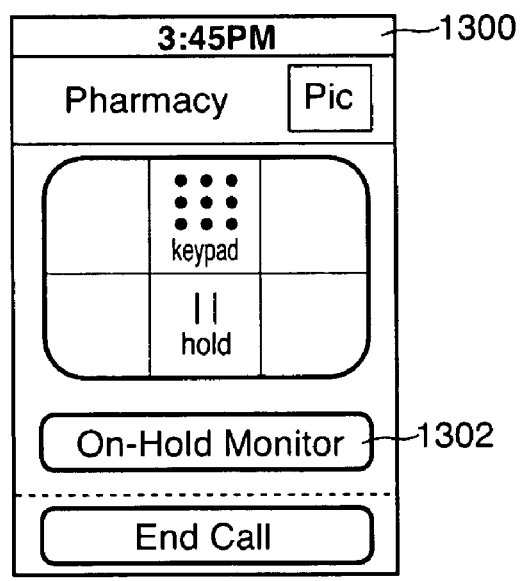
FIGS. 13A-13D are a sequence of display screens illustrating an operating scenario in accordance with an embodiment of the invention.

The electronic device may provide display screen 1300 of FIG. 13A while the user is on the telephone call. Display screen 1300 can include a number of different options (e.g., options to hang up, place the other part on hold, etc.), including option 1302 to enable on-hold monitoring. Responsive to a user selecting on-hold monitoring option 1302, the electronic device may attempt to locate an entry in the call center database for the other party. Since the electronic device cannot do so in this example, the electronic device may provide display screen 1310 of FIG. 13B.

Figure 13B:
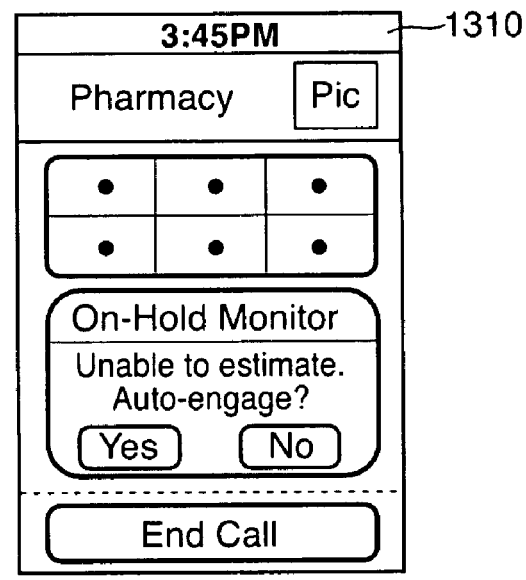
Figure 13C:
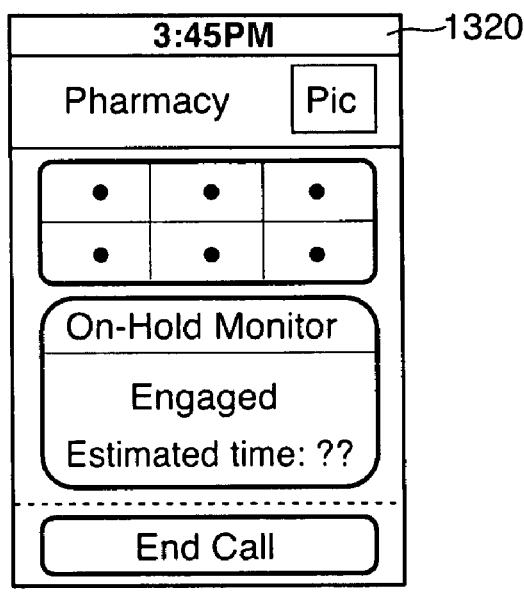

Display screen 1310 of FIG. 13B informs the user that the electronic device cannot provide an estimated on-hold wait time, and prompts the user to either engage or not engage on-hold monitoring anyway. Responsive to a user selection to engage on-hold monitoring, the electronic device can enable on-hold monitoring and provide display screen 1320 of FIG. 13C as a confirmation to the user. The electronic device may continue to display this screen until, for example, the user selects to perform a non-phone-related task (e.g., go to the "home screen," or play movies, games, or music), the user disengages on-hold monitoring (e.g., by double-tapping on the on-hold monitoring area of display screen 1320), or until the electronic device determines that the live operator is or will soon be present.

Figure 13D:
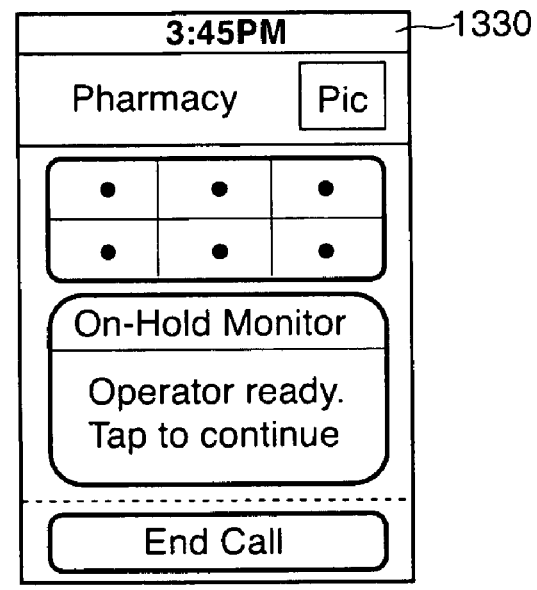

In response to determining that a live operator is present on the telephone call, the electronic device may provide display screen 1330 of FIG. 13D. This may function as an alert to the user, and gives the user an option to return to and take control of the telephone call.

Turning now to FIGS. 14A-14H, another illustrative sequence of display screens are shown. This sequence illustrates the display screens that an electronic device might provide when the electronic device is able to locate a call center in the call center database. First, the electronic device may start the process of engaging on-hold monitoring in any of a variety of ways, such as manually from selecting option 1402 from display screen 1400 or automatically based on user preferences. While the electronic device accesses the call center database, the electronic device can provide display screen 1410 of FIG. 14B informing the user of this task.

Figure 14A:
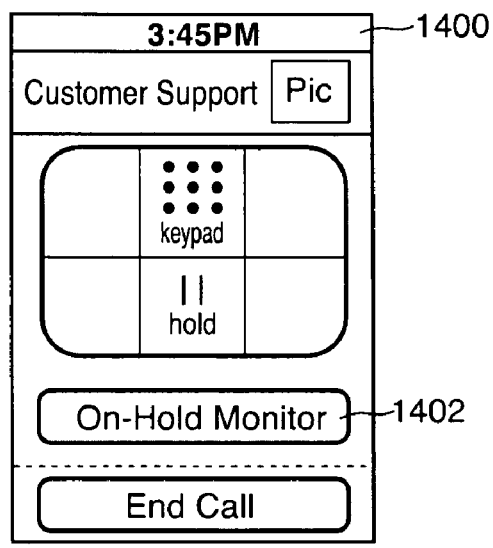
FIGS. 14A-14H are a sequence of display screens illustrating another operating scenario in accordance with an embodiment of the invention.
Figure 14B:
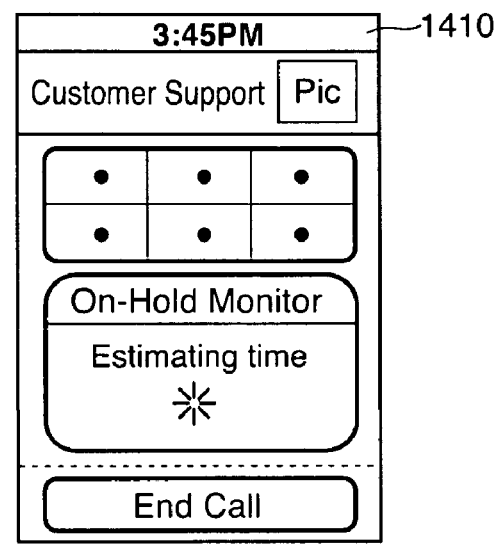
Figure 14C:
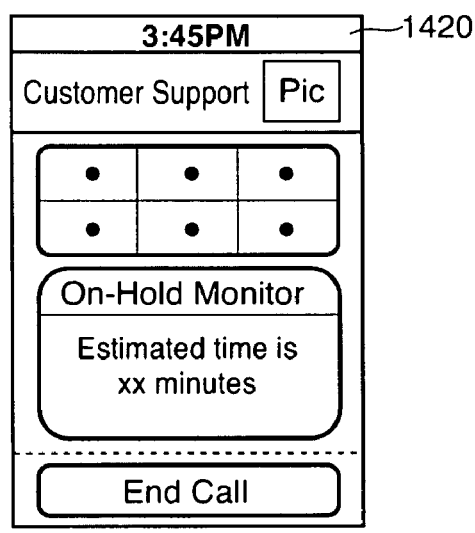
Figure 14D:
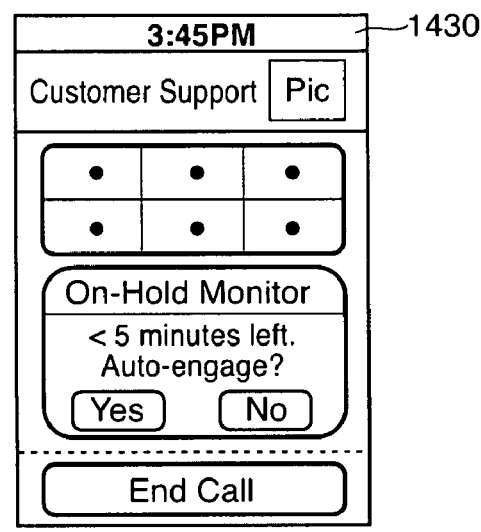
Figure 14E:
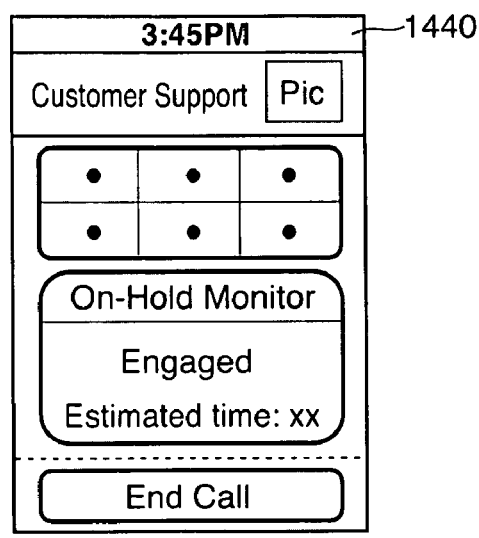

Responsive to determining the estimated on-hold wait time associated with the call center, the electronic device may provide display screen 1420 of FIG. 14C informing the user of this estimated time. If the estimated time is below a predetermined threshold (e.g., five minutes), the electronic device may provide display screen 1430 of FIG. 14D so that the user can decide whether to engage on-hold monitoring even though there will probably be a short wait time. If the estimated time is not below the predetermined threshold, or if the user selects to engage on-hold monitoring from display screen 1430, the electronic device can enable on-hold monitoring and provide display screen 1440 of FIG. 14E as a confirmation to the user.

Figure 14F:
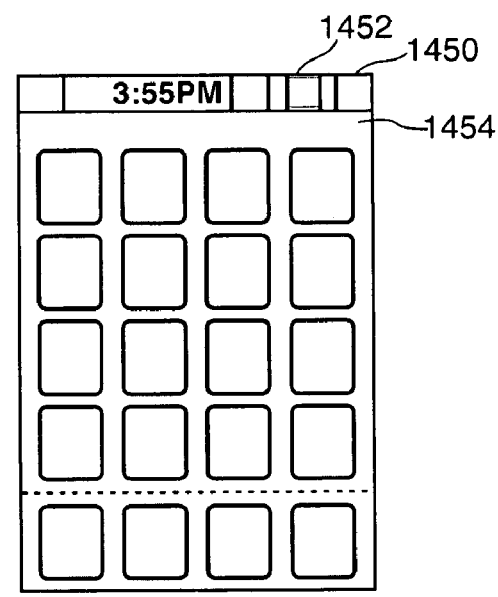

If the user chooses to perform a non-phone-related task while on-hold monitoring is engaged, the electronic device may first provide display screen 1450 of FIG. 14F. Display screen 1450 can include home screen 1454 and hold status area 1452. Hold status area 1452 can keep the user updated with the estimated wait time for the telephone call while the user performs any non-phone-related tasks.

Figure 14G:
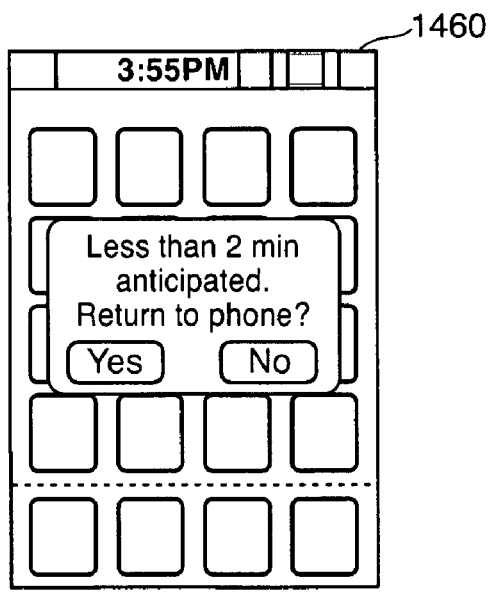
Figure 14H:
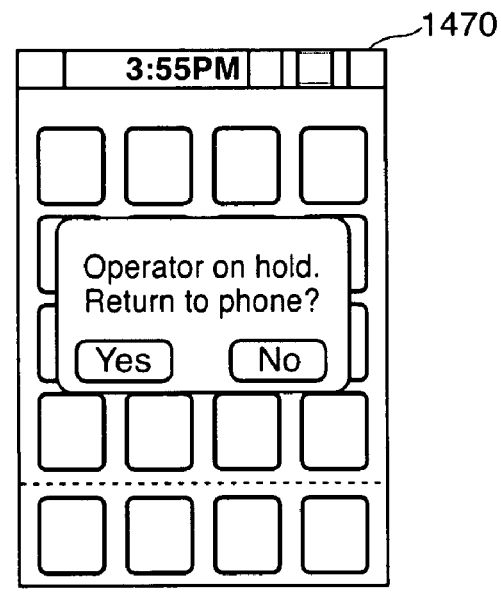

Responsive to determining that the live operator is or will soon be present on the telephone call, the electronic device can provide either display screen 1460 of FIG. 14G or display screen 1470 of FIG. 14H. In particular, the electronic device may provide display screen 1460 when the live operator is expected soon (e.g., in less than two minutes), while the electronic device may provide display screen 1470 when the live operator has already returned to the call and has been put on hold.

The described embodiments of the disclosure are presented for the purpose of illustration and not of limitation. For example, while various embodiments have been described in terms of using on-hold monitoring for telephone calls made by the user, the on-hold monitoring feature may be used for any other telephone calls, such as telephone calls received by the user or telephone calls connected with non-call centers. Also, while various embodiments have been described in terms of using on-hold monitoring for telephone calls with customer service departments or other business departments, the on-hold monitoring feature can be employed for telephone calls connected with any call recipient (e.g., personal calls). The invention is limited only by the claims that follow.

What is claimed is:

1. A user electronic device for monitoring on-hold calls with a call center, comprising:
   communications circuitry that receives telephone data from a telephone call with the call center;
   a speech processor that detects hold status information from the telephone data when the telephone call is placed on hold, wherein the hold status information comprises at least one keyword indicating at least one of a place in a hold queue and an estimated amount of time until a live operator is expected; and control circuitry that:
 determines, from the hold status information, whether an estimated wait-time is below a predetermined threshold; and
 provides an alert responsive to the determining.

2. The user electronic device of claim 1, wherein the alert is at least one of a visual alert, an audio alert, and a haptic alert.

3. The user electronic device of claim 1, wherein the control circuitry:
 receives a user request to have the user electronic device take control of the telephone call; and
 directs the speech processor to start detecting for the hold status information in response to receiving the user request.

4. The user electronic device of claim 1, wherein the control circuitry:
 decides on whether to monitor the telephone call based on at least one of user preferences, the identity of the call center, and an expected wait-time; and
 directs the speech processor to start detecting for the hold status information based on the deciding.

5. The user electronic device of claim 1, wherein the control circuitry:
 provides the hold status information to the user while the user is placed on hold.

6. A method of monitoring a telephone call using a user electronic device, the method comprising:
 monitoring, with the user electronic device, the telephone call using a background process while the telephone call is placed on hold process;
 enabling, with the user electronic device, a second process to occur concurrently with the background process;
 detecting, with the user electronic device, an indicator signaling the presence of a live operator on the telephone call;
 determining, with the user electronic device, a status of the user electronic device;
 selecting, with the user electronic device, an alert mode based on the status; and
 in response to the detecting, prompting, with the user electronic device, the user to take control of the telephone call, wherein the prompting is based on the selected alert mode;
 receiving, with the user electronic device, a user input responsive to the prompting; and
 giving, with the user electronic device, control of the telephone call to the user.

7. The method of claim 6, wherein the enabling the second process comprises:
 running, with the user electronic device, a non-phone-related task on the user electronic device.

8. The method of claim 7, wherein the giving control of the telephone call comprises:
 suspending, with the user electronic device, the non-phone-related task.

9. The method of claim 8, wherein the giving control of the telephone call further comprises:
 determining, with the user electronic device, that the non-phone-related task uses audio resources, wherein the suspending is performed responsive to the determining.

10. A method of detecting the presence of a live operator on a telephone call, the method comprising:
 monitoring, with a user electronic device, incoming telephone data from the telephone call for hold status information using a first set of keywords;
 determining, with the user electronic device, whether the hold status information is detectable from the incoming telephone data based on the monitoring; and
 processing, with the user electronic device, the incoming telephone data using an expanded set of keywords when the hold status information is not detectable based on the determining, wherein the expanded set of keywords comprises indicators indicating the live operator is present on the telephone call.

11. The method of claim 10, wherein the first set of keywords comprises indicators indicating at least one of a place in a hold queue and an estimated amount of time until a live operator is expected.

12. The method of claim 11, wherein the first set of keywords comprises at least one phrase including a number followed by a unit of time.

13. The method of claim 10, further comprising:
 in response to determining that the hold status information is detectable based on the monitoring, determining, with the user electronic device, whether the hold status information indicates an estimated wait-time;
 continuing the monitoring, with the user electronic device, of the incoming telephone data for more hold status information when the estimated wait-time is above a predetermined threshold; and
 alerting, with the user electronic device, the user when the estimated wait-time is below the predetermined threshold.

14. The method of claim 10, further comprising:
 detecting, with the user electronic device, a presence of at least one of the keywords from the expanded set of keywords responsive to the processing; and
 alerting, with the user electronic device, the user responsive to the detecting.

15. A system for handling telephone calls, the system comprising:
 a database for storing call center information about a plurality of call centers; and
 a user telephone device that:
  receives a user indication to make a telephone call to one of the call centers;
  obtains the call center information for the one of the call centers from the database; and
  enables on-hold monitoring based on the obtained call center information for the one of the call centers.

16. The system of claim 15, wherein the call center information for the one of the call centers comprises at least one of an average on-hold wait-time for the one of the call centers, an expected on-hold wait-time for at least one department in the one of the call centers, information about quality of service provided by the one of the call centers, whether the one of the call centers includes an automated telephone system, and a review by at least one previous caller for the one of the call centers.

17. The system of claim 15, wherein the database is located on the user telephone device.

18. The system of claim 15, wherein the system further comprises a server remote from the user telephone device, and wherein the database is located on the server.

19. The system of claim 18, wherein:
 the user telephone device is further configured to transmit statistical information about the telephone call to the server; and
 the server is configured to update the call center information in the database for the one of the call centers based on the statistical information.

20. A server comprising a call center database, wherein the server:
  receives statistical information from a plurality of user telephone devices about a plurality of telephone calls, wherein the telephone calls are associated with a plurality of call centers;
  processes the statistical information to generate call center information, wherein the call center information comprises at least one average on-hold wait-time for each of the call centers;
  stores the call center information in the call center database;
  receives a request from one of the user telephone devices to transmit the call center information for one of the call centers to the one of the user telephone devices; and
  transmits the call center information for the one of the call centers to the one of the user telephone devices.

21. The server of claim 20, wherein the statistical information comprises:
  an amount of time that each of the telephone calls was placed on hold.

22. The method of claim 6, wherein:
  the status of the user electronic device is idle; and
  the selected alert mode comprises at least one of an audio mode, a haptic mode, and a visual mode.

23. The method of claim 6, wherein:
  the status of the user electronic device is active; and
  the selected alert mode comprises at least one of a haptic mode and a visual mode.

24. The method of claim 6, wherein:
  no user input is received in response to the prompting; and
  the method further comprises:
    in response to no user input being received, re-selecting, with the user electronic device, an alternative alert mode; and
    in response to the re-selecting, re-prompting, with the user electronic device, the user to take control of the telephone call based on the alternative alert mode.

25. The method of claim 6, wherein the status of the user electronic device is based on the second process.

26. A method of monitoring a telephone call using a user electronic device, the method comprising:
  monitoring, with the user electronic device, the telephone call using a background process while the telephone call is placed on hold;
  enabling, with the user electronic device, a second process to occur concurrently with the background process;
  detecting, with the user electronic device, an indicator signaling the presence of a live operator on the telephone call;
  determining, with the user electronic device, the second process occurring concurrently with the background process;
  selecting, with the user electronic device, an alert mode based on the second process occurring concurrently with the background process; and
  in response to the detecting, prompting, with the user electronic device, the user to take control of the telephone call, wherein the prompting is based on the selected alert mode.

27. The method of claim 26, wherein:
  the second process occurring concurrently is a music application; and
  the alert mode selected is an audio mode.

28. The method of claim 26, wherein:
  the second process occurring concurrently is a game application; and
  the alert mode selected is at least one of an audio mode and a haptic mode.

29. The method of claim 26, wherein:
  no user input is received in response to the prompting; and
  the method further comprises selecting, with the user electronic device, an alternative alert mode.

* * * * *